(12) United States Patent
Osterholzer

(10) Patent No.: US 6,477,636 B1
(45) Date of Patent: Nov. 5, 2002

(54) APPLICATION-SPECIFIC INTEGRATED CIRCUIT FOR PROCESSING DEFINED SEQUENCES OF ASSEMBLER INSTRUCTIONS

(75) Inventor: Rudolf Osterholzer, Unterhaching (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/337,639

(22) Filed: Jun. 22, 1999

(30) Foreign Application Priority Data

Jun. 23, 1998 (DE) .......................... 198 27 914

(51) Int. Cl.[7] .............................. G06F 9/24; G06F 9/30; G06F 9/445; G06F 9/45
(52) U.S. Cl. .............................. 712/41; 712/36; 712/17; 712/245; 712/243; 712/244; 712/227; 714/30; 717/5; 717/8
(58) Field of Search ....................... 712/23, 215, 24, 712/217, 25, 219, 27, 48, 41, 245, 42, 244, 36, 246, 43, 242, 243, 283, 227, 201, 229, 202, 234, 206, 209, 4, 231, 17; 709/108, 103, 102, 319, 212, 105, 106, 107; 711/201, 123, 211, 132, 212, 125; 710/27, 25, 22, 261, 28, 266, 267, 264; 707/705; 717/5, 10, 8, 4, 3, 2, 9; 714/45, 28, 30

(56) References Cited

U.S. PATENT DOCUMENTS

| 4,833,640 | A |   | 5/1989 | Baba ........................... 709/108 |
| 5,420,984 | A | * | 5/1995 | Good et al. ................... 710/22 |
| 5,715,458 | A | * | 2/1998 | Holder et al. ................ 709/319 |

FOREIGN PATENT DOCUMENTS

| DE | 43 01 117 | 12/1993 |
| DE | 195 30 483 | 2/1997 |

OTHER PUBLICATIONS

D. Otto et al. "Iridium—eine Vision wird Wirklichkeit", Siemens Telecom Report, vol. 18, No. 2, 72–74 (1995).

* cited by examiner

Primary Examiner—Daniel H. Pan
(74) Attorney, Agent, or Firm—Schiff Hardin & Waite

(57) ABSTRACT

The invention relates to an application-specific integrated circuit (ASIC) for processing defined sequences of assembler instructions (TASKs). To improve data throughput in applications with high memory access rates, the ASIC contains a TASK scheduler, which is implemented as hardware and which chronologically coordinates, in an appropriate manner, the processing of different TASKs on an ASIC internal processing means (EXU). Compared to conventional software control units for multitasking systems, this TASK scheduler which is implemented as hardware offers the advantage, among others, that the operating system is relieved of load, and an expensive memory architecture is not required.

5 Claims, 2 Drawing Sheets

APPLICATION-SPECIFIC INTEGRATED CIRCUIT FOR PROCESSING DEFINED SEQUENCES OF ASSEMBLER INSTRUCTIONS

BACKGROUND OF THE INVENTION

1. Field of the Invention

The present invention relates to an application-specific integrated circuit (ASIC) for processing defined sequences of assembler instructions (TASKs).

2. Description of the Prior Art

The performance of a processor is strongly dependent on the memory access times needed to load program code or operands into the processor. Due to slow access times, long dead times arise, particularly in the processing unit (EXU) of a RISC processor which is rapidly clocked. These dead times necessarily lead to a degradation of data throughput.

Different approaches have been suggested to improve the data throughput of a processor. One approach consists in the implementation of expensive cache memory systems. But these cache systems are highly ineffective for applications in which the data is used only once, since a high cache miss rate then arises.

Another approach to increasing the data throughput in I/O processors consists in the execution of a software-controlled TASK change during the execution of a TASK by the EXU, given longer wait times. This TASK change is consequently controlled by the operating system. However, this TASK change regularly requires many additional memory operations for securing and recovering the old and new TASK status, so that this type of TASK change is worthwhile only when given very long wait times, such as in the accessing of external hard disks.

U.S. Pat. No. 4,833,640 discloses a data processing system which comprises a number of register banks in a random access memory (RAM). Access to these register banks and to the registers contained in the register banks occurs according to corresponding processor instructions. The instruction CBNR prompts a change of access from one register bank to another register bank, or a data transfer from a register in one register bank into a register in another register data bank. The register accesses occur under the control of a memory access control circuit and a number of control registers.

German Patent Application No. 43 01 117 discloses a multitasking capable computing device and a method for its operation. The computing device comprises a processor with at least one register set for each TASK to be executed. The computing device also comprises a TASK allocator which assigns the processor that TASK which has the highest precedence rating as the next TASK to be executed.

SUMMARY OF THE INVENTION

It is an object of the invention to provide an application-specific integrated circuit (ASIC) having a RISC processor with an improved loading of its internal EXU.

This object is inventively achieved in accordance with the present invention.

Besides a program and data memory, the RISC processor inventively also has an EXU for executing TASKs, in which it is possible to switch to a second TASK during the execution of a first TASK if the execution of the first TASK has been first interrupted. The TASK changeover process is controlled by a TASK scheduler implemented as hardware.

The hardware-controlled TASK changeover offers the advantage that the operating system is relieved from the responsibility of the TASK management, so that it can fulfill other tasks to a greater degree or can be extremely simplified. With the implementation of the TASK scheduler, the entire processing power of the EXU is now available exclusively for handling user firmware.

The TASK scheduler also enables a rather rapid TASK change, i.e. within a few clock cycles, thereby minimizing the dead times of the EXU and maximizing its load or its data throughput.

According to an advantageous development of the TASK scheduler, it comprises a separate TASK controller for each TASK, which detects and controls changes of the current status (RUN, WAIT, READY or HALT) of the TASK allocated to it and which generates a corresponding change information, which is made available to the TASK scheduler. On the basis of this change information, the TASK scheduler controls the changeover process.

Furthermore, an I/O interface is advantageously arranged in the circuit between an external data memory and an internal data bus and has an individual data channel for each TASK. By means of monitoring the data transfer on each individual data channel by the individually allocated TASK controller, a change of the status of the respective TASK can be detected.

It is additionally noted that, for the data transfer between it and the external data memory, the I/O interface advantageously has only one common data channel for all TASKs. By using a common data channel for all TASKs, two interfaces or data channels are saved.

According to an advantageous development of the invention, the circuit comprises register banks which are individually allocated to the TASKs and which are connected to the internal data bus. The register banks store specific data about the status of a respective TASK at the time of its interruption or data which was processed by a TASK prior to its interruption. Due to the use of register banks, a complex memory architecture, which is required in conventional multitasking control systems, is forgone.

According to a particularly simple development of the invention, at least one FIFO memory is provided in the circuit. The FIFO memory is arranged as a unidirectional interface between external components and the internal data bus and which is controlled by a TASK controller which is allocated to it without requiring expensive addressing.

DESCRIPTION OF THE PRESENTLY PREFERRED EMBODIMENTS

Figure 1:
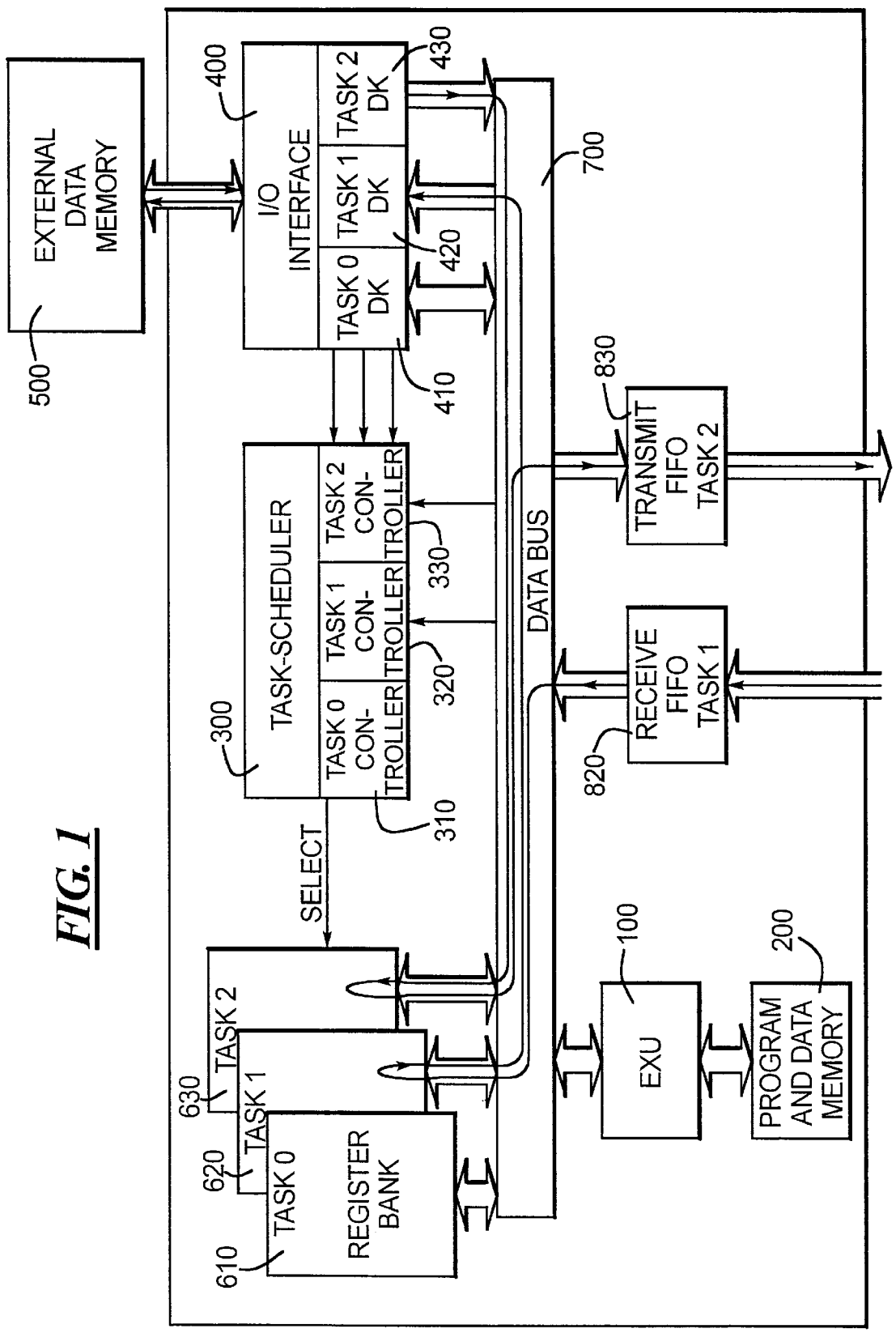
FIG. 1 is a functional block diagram of the hardware structure of a circuit constructed and operated in accordance with the invention.
Figure 2:
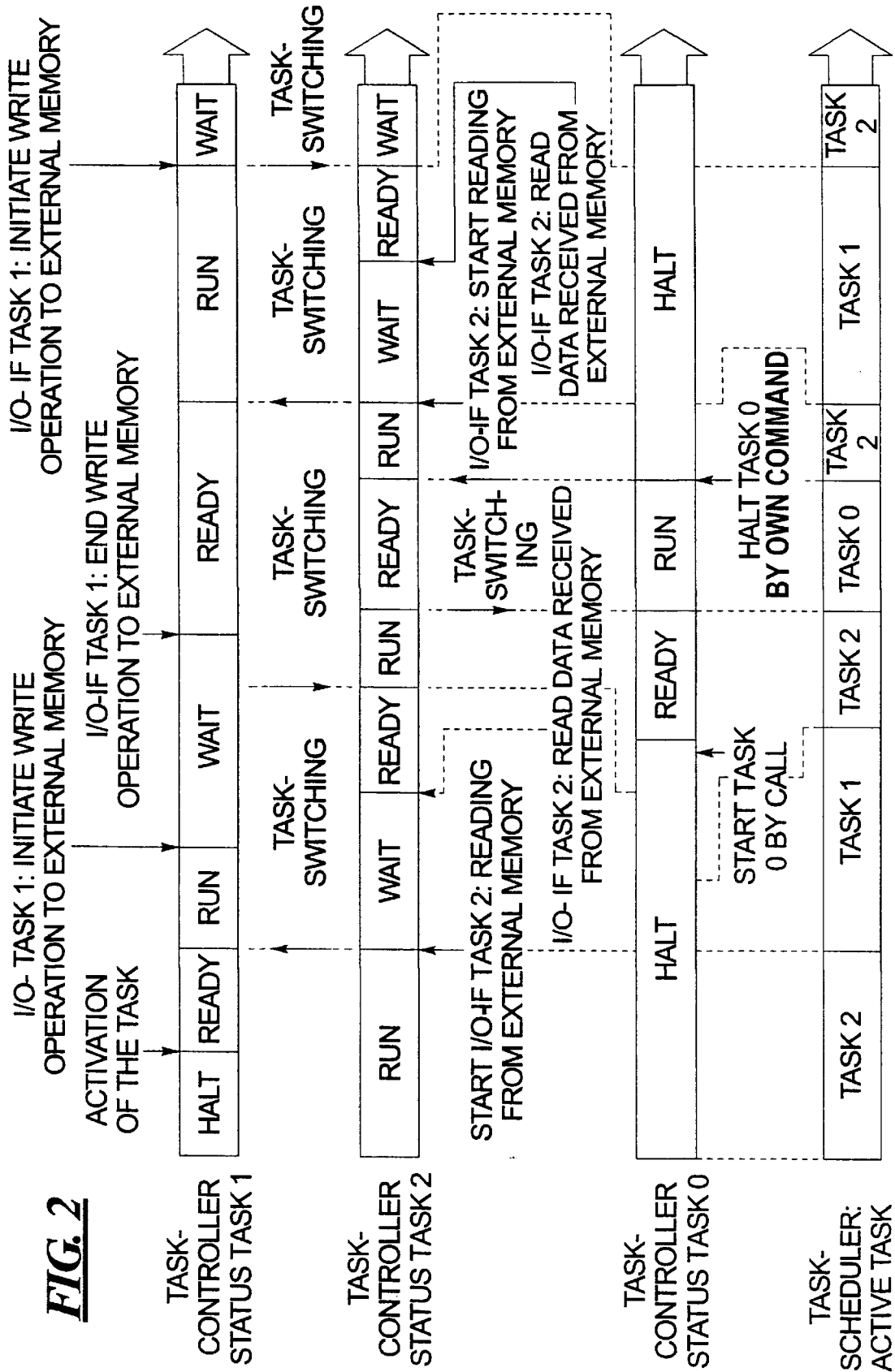
FIG. 2 is a flow diagram of a TASK changeover by a TASK scheduler in accordance with the invention.

Before the circuit according to FIG. 1 and the hardware-controlled changeover of individual TASKs according to FIG. 2 are described, a few explanatory comments are first made with respect to the TASK concept.

As mentioned above, a TASK is a software module consisting of a defined sequence of assembler instructions of the processor used. TASKs are usually defined by program developers as modules of a program code to be created. In many applications, a distinction of three TASKs is sufficient.

Specifically, a receive TASK, a transmit TASK, and a supervisor TASK are distinguished. As a component of the program code, the supervisor TASK serves only for initializing, for executing debug operations, and for error processing. A description of the receive and transmit TASKs is given later in the framework of the description of the functioning of the circuit according to FIG. 1.

The various TASKs usually function independent of one another, though in essence certain mutual interactions are possible, such as mutual calls or a communication via common memory areas. Nevertheless, there is a TASK hierarchy wherein the supervisor TASK has the highest priority. On the basis of its highest priority, the supervisor TASK can interrupt the receive and transmit TASKs with lower priority at any time due to an event.

The receive and transmit TASKs can assume four different states, respectively. These are:

the HALT state, in which the TASK is inactive and is not considered by the TASK, the RUN state, in which the TASK is active and is processed by the EXU, the WAIT state, in which the TASK is active but blocked, and the READY state, in which the TASK is likewise active but is waiting for an allocation to the EXU.

The supervisor TASK can likewise assume the states HALT, RUN and READY, but not the WAIT state.

The circuit illustrated in FIG. 1 comprises an EXU 100, which is connected to a program and data memory 200 in which defined sequences of assembler instructions (TASKs) are stored. Via an internal data bus 700, the EXU 100 is connected to an I/O interface 400, via which it can exchange data with an external data memory 500. For the data transfer between it and the data bus 700, the I/O interface 400 has an individual data channel DK 410,420,430 for each TASK (e.g. for a TASK 0 (supervisor TASK), a TASK 1 (receive TASK), a TASK 2 (transmit TASK)), which channel is connected to the data bus 700, respectively. The individual data channels 410 to 430 are respectively connected, via individual control lines, to the TASK controllers 310 to 330 that are respectively allocated to them. For the data transfer between it and the external data memory 500, the I/O interface 400 comprises only one common data channel for all TASKs. The transition from three data channels to one within the I/O interface 400 occurs with the aid of a multiplexer.

The TASK controllers are components of a TASK scheduler 300, which allocates a TASK to the EXU 100 for processing.

Finally, the circuit according to FIG. 1 shows separate register banks 610, 620, 630 for each TASK, which are connected to the data bus 700, as are two FIFO memories 820 (receive FIFO) and 830 (transmit FIFO). While the register banks 610 to 630 permit a bidirectional data exchange, each of the FIFO memories 820 and 830 permit only a unidirectional data exchange with the internal data bus 700. Via a select line SELECT, the TASK scheduler 300 enables that register bank 610, 620, 630 which is allocated to the TASK currently being processed by the EXU 100.

A description of the functioning of the circuit according to FIG. 1 follows. This is given as an example of the execution of a receive TASK and a transmit TASK.

The receive TASK is started on the EXU 100 in a hardware-triggered fashion when its pertaining TASK controller 320 registers, in the receive FIFO 820, the input of data by external components. The execution of the receive TASK by the EXU 100 first effects a loading of the received data in the register bank 620 that is specific to the receive TASK, so that it is modified there. The modified data is subsequently written into the external data memory 500 via the data bus 700 and the data channel 420, which is specific to the receive TASK, of the I/O interface 400.

While the receive TASK is being executed on the EXU 100, it is in the RUN state. However, if it is determined in the framework of the execution of the receive TASK that there are no more data in the receive FIFO 820, then the receive TASK switches itself from the RUN state to the HALT state.

The transmit TASK works the same way, but with an opposite data transfer direction than the receive TASK. The transmit TASK is periodically started on the EXU 100, in order to transfer data into its register bank 630 from the external data memory 500 via its own transmission data channel 430 of the I/O interface 400 and via the data bus 700. The data is processed there in order to be subsequently written into the transmit FIFO 830 via the data bus 700. The data is temporarily stored there until it can be outputted to an external component. During its execution on the EXU 100, the transmit TASK is in the RUN state. If it is determined during the execution of the transmit TASK that there are no more data in the external data memory 500 awaiting processing by the transmit TASK, then the transmit TASK also switches of itself from the RUN state to the HALT state.

The data transfer on the individual data channels 410, 420, 430 is permanently monitored by the individually allocated TASK controllers 310, 320, 330. If a controller 310, 320, 330 detects changes in the data transfer on "its" data channel, then this indicates a change of the current state of the TASK allocated to it, as such changes of state occur on the basis of hardware events, such as an accessing of the external data memory 500. In particular, an individual TASK can go through the following changes of state:

Change from the RUN state into the WAIT state (does not apply to supervisor TASK):

As long as the TASK is being processed by the EXU 100, the TASK is in the RUN state. However, if, in the course of the processing, a read access or a write operation on the external data memory 500 occurs via the I/O interface 400, then the I/O interface 400 executes this operation autonomously, i.e. independent of the EXU, with its TASK-specific data channels 410, 420, 430. During this time, the TASK assumes the WAIT state. In a write operation, the TASK assumes the WAIT state only if a write operation has likewise been started immediately beforehand, and this still occupies the TASK-specific data channel.

Change from the WAIT state to the READY state (does not apply to supervisor TASK):

If, during the WAIT state of a TASK, a read access to the external data memory 500 occurs, and the required read data stand ready for collection by the processor in the TASK-specific data channel 410, 420, 430 of the I/O interface 400, then the TASK switches from the WAIT state into the READY state.

An analogous change of state occurs in write operations to the external data memory 500 if the data to be written is temporarily stored in the TASK-specific data channel 410, 420, 430 of the freed I/O interface 400 prior to its transfer to the external data memory 500.

Change from the READY state to the RUN state:

A TASK switches from the READY state to the RUN state when EXU execution time is allocated to it. This is explained in greater detail below with the aid of FIG. 2.

Change from the RUN state to the HALT state:

This change of state typically occurs only on the basis of a TASK-specific instruction, the effect of which is that the TASK is switched to inactive. It is triggered in the receive or transmit TASKs, for example, in that there is no longer any data awaiting processing.

Change from the HALT state to the READY state:

This change of state is associated with an activation of a previously inactive TASK. An activation can occur, for example, by means of an activation signal of a timer or on the basis of the instruction of another TASK.

In the above explanation, specific TASKs were considered essentially individually. In particular, their individual methods of functioning and the changes of state they pass through in the execution were described.

Based on the changes of state that each TASK passes through during its execution, a description now follows, with reference to FIG. 2, of the multitasking of the various TASKs, which is controlled by the TASK scheduler 300.

FIG. 2 exemplarily depicts the changes of state for the TASK 1 and the TASK 2. The TASK 1 passes through the states HALT, READY, RUN, WAIT, READY, and RUN in succession, while the TASK 2 passes through the states RUN, WAIT, READY, RUN, READY, RUN, WAIT, and READY in succession. At the same time, the TASK 0 passes through the states HALT, READY, RUN and HALT. For each individual TASK, all these changes of state are controlled by the TASK controller that is individually allocated to it.

Since there is only one EXU 100, the execution of only one TASK is possible at a time. To optimize the loading of the EXU 100 and thus the data throughput of the circuit, the individual TASKS are not processed by the EXU 100 sequentially, but according to the multitasking principle. The coordination of the changes of state of the individual TASKS, which is required for the multitasking, occurs by means of the TASK scheduler 300, which is implemented as hardware.

When the TASK controller 330 registers a read access of the TASK 2 to the external data memory 500, it switches the TASK 2 from the RUN state to the WAIT state. The TASK controller 330 communicates this change information to the TASK scheduler 300, which subsequently prompts the TASK controller 320 to switch the TASK 1 from the READY state to the RUN state.

The initial processing of the TASK 2 in the EXU 100 is thus interrupted, and the TASK 1 is allocated to the EXU 100 for processing. The processing of the TASK 1 in the EXU 100 occurs until the TASK controller 320 register a write operation of the TASK 1 to the external data memory 500, whereupon it switches the TASK 1 to the WAIT state.

As illustrated in FIG. 2, as long as the WAIT state of the TASK 1 has not yet been replaced by a READY state, because the write operation to the external data memory 500 has not yet been ended by the I/O interface 400, a dead time actually arises for the EXU 100, because now both the TASK 1 and TASK 2 are simultaneously in the WAIT state.

But TASK 1 remains allocated to the EXU 100 regardless of its change of state from the RUN state to the WAIT state, as can be seen in the last box in FIG. 2.

Based on the simultaneous WAIT states of TASK 1 and TASK 2, that TASK is processed next by the EXU whose operation with the external data memory 500 is successfully executed and ended by the I/O interface 400 first. As soon as the end of an operation is detected as a change of the data transfer by a TASK controller in a data channel DK of the interface, this controller switches its TASK from the WAIT state to the READY state, which is illustrated for the TASK 2 in FIG. 2.

The TASK controller 330 subsequently informs the TASK scheduler 300 of the READY state of the TASK 2, whereupon this promptly allocates the TASK 2 to the EXU 100, as TASK 1 is still in the WAIT state. With the allocation of TASK 2 to the EXU 100, the TASK controller 330 switches its TASK 2 from the READY state to the RUN state.

As can be seen in FIG. 2 from the changes of state for the TASKs 1 and 2, the EXU 100 is better loaded overall by the described multitasking principle, because it is allocated a different TASK for processing during the wait state of a TASK previously in the RUN state.

An interruption of the RUN state of a TASK can be initiated not only by wait times for an external storage operation, but also when the EXU 100 is demanded by a TASK of higher priority, such as by the supervisor TASK 0.

This typically happens when the TASK 0 is communicated to the TASK scheduler 300 by the TASK controller 310, that this is in the READY state. The TASK scheduler 300 subsequently interrupts the processing of TASKs with lower priority in the EXU 100, and allocates the TASK 0 to this for processing.

The TASK 2 is subsequently switched by its controller 330 from the RUN state to the READY state, while the TASK 0 is simultaneously switched by its controller 310 from the READY state to the RUN state.

After the completed execution of the TASK 0, the TASK scheduler again imparts the previously interrupted TASK 2 to the EXU 100 for processing. Consequently, the TASK 0 is switched from the RUN state to the HALT state by its controller 310, while at the same time, the previously interrupted TASK 2 is switched by its controller from the READY state to the RUN state again.

Such interrupts by the supervisor TASKs nevertheless typically occur only given specific events, such as in initializing, given the occurrence of errors, given external alarm signaling, or when the supervisor TASK 0 is called up by another TASK.

Each TASK in itself would only load the EXU 100 approximately halfway, because the respective processing by the EXU would have to be interrupted quite frequently due to accesses to the external data memory 500. In the application of TASKs which respectively provide about as many accesses to the external data memory 500, the TASK scheduler, which is implemented as hardware, presents a good possibility to chronologically interleave these slow accesses, in order to thereby improve the data throughput of the circuit. Even if the processor is rather asymmetrically loaded by the two TASKs, there is still always a benefit in the total balance for its data throughput.

Although modifications and changes may be suggested by those of ordinary skill in the art, it is the intention of the inventor to embody within the patent warranted hereon all changes and modifications as reasonably and properly come within the scope of his contribution to the art.

What is claimed is:

1. An application-specific integrated circuit comprising:
    a RISC processor that processes defined sequences of assembler instructions;
    a program and data memory that stores said sequences of assembler instructions;
    a processing unit that executes said sequences of assembler instructions; an internal data bus;
    an I/O interface arranged between said internal data bus and an external data memory;
    a sequence of assembler instructions scheduler configured as hardware that switches from one sequence of assembler instructions to another sequence of assembler instructions when execution of a first one of said sequence of assembler instructions has been interrupted, wherein each sequence assembler instructions, is assigned its own sequence of assembler instructions controller that determines a current state of said assigned sequence of assembler instructions and outputs corresponding state information, and said sequence of assembler instructions scheduler is configured such that it allocates said sequence of assembler instructions to said processing unit according to said determined current state.

2. The application-specific integrated circuit according to claim 1, wherein said I/O interface has an individual data channel for each sequence of assembler instructions that transfers data between said I/O interface and said internal data bus, wherein said data channel performs said data transfer for each sequence of assembler instructions; and further comprising a monitor that monitors said data channel of said assigned sequence of assembler instructions controller for changes of said data transfer to detect, on a basis of said change, changes of a state of said respective sequence of assembler instructions.

3. The application-specific integrated circuit according to claim 2, wherein said I/O interface comprises a common data channel for all sequence of assembler instructions that transfer data between said I/O interface and said external data memory.

4. The application-specific integrated circuit according to claim 2, further comprising register banks connected to said internal data bus and allocated to said individual sequence of assembler instructions and the store specific data about a sequence of assembler instructions subsequent to an interruption of said executed sequence of assembler instructions.

5. The application-specific integrated circuit according to claim 1, further comprising at least one FIFO memory arranged as a unidirectional interface between external components and said internal data bus and which is controlled by a sequence of assembler instructions controller that is allocated to said at least one FIFO memory.

* * * * *